UNITED STATES PATENT OFFICE 2,512,789

PYRIDINIUM COMPOUNDS

Francis E. Cislak and Leslie H. Sutherland, Indianapolis, Ind.

No Drawing. Application October 24, 1946, Serial No. 705,482

8 Claims. (Cl. 260—290)

This invention relates to a new class of chemical compounds and to the process of making them. More particularly it relates to the class of chemical compounds formed by reacting a vinylpyridine with a pyridine salt, which compounds may be represented by the following general formula:

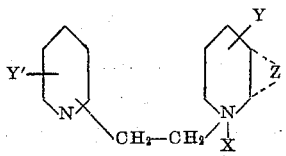

In this formula the group

represents hydrogen, a benzo, or a substituted benzo radical; Y and Y' represent hydrogen, an alkyl, or a substituted alkyl radical; X represents an anion.

In general, the compounds of this invention may be prepared by reacting a vinylpyridine, or a compound which upon dehydration is converted into a vinylpyridine, with a pyridine salt. The reaction is advantageously carried out in a solvent, although it is not necessary to use a solvent.

By the term "pyridine salt" we mean a compound formed by interaction of a pyridine and an inorganic acid and having the general formula:

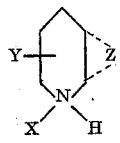

in which the group

represents hydrogen, a benzo, or a substituted benzo radical; Y represents hydrogen, an alkyl, or a substituted alkyl radical; X represents an anion.

By the term "benzo" we mean the divalent radical $C_4H_4\text{=}$.

Our invention is described more fully in the following specific examples of forming the new compounds therein set forth. It should be understood, however, that these examples are given by way of illustration only and that our invention is not to be limited to the details set forth therein. The parts are by weight.

EXAMPLE 1

*2-pyridylethylpyridinium chloride*

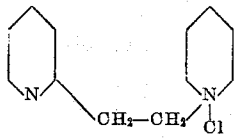

A solution of 29 parts of pyridine hydrochloride in 20 to 30 parts of pyridine is prepared in any convenient manner. While stirring the pyridine hydrochloride solution, 26 parts of 2-vinylpyridine is slowly added to it. A reaction occurs most immediately, heat is evolved, and the temperature of the mixture rises. After all the 2-vinylpyridine has been added, the stirring is continued for from about 15 minutes to about 1 hour. Then the mixture is cooled to about 15° C. to 25° C. Upon such cooling 2-pyridylethylpyridinium chloride crystallizes from the solution. The crystals of 2-pyridylethylpyridinium chloride are separated from the mother liquor in any convenient manner, as by filtration or centrifugation; they are washed with acetone to remove any mother liquor adhering to them, and are then dried.

The 2-pyridylethylpyridinium chloride melts at about 73° C.; it is freely soluble in water but is insoluble in hydrocarbon solvents.

If in place of the pyridine hydrochloride solution used above we use a molecular equivalent amount of quinoline hydrochloride dissolved in quinoline we obtain 2-pyridylethylquinolinium chloride.

EXAMPLE 2

*2-pyridylethylpyridinium thiocyanate*

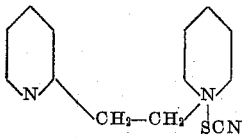

A solution of 36 parts of thiocyanic acid in 140 parts of pyridine is prepared in any convenient manner. While stirring the pyridine solution of thiocyanic acid, 55 parts of 2-vinylpyridine is slowly added to it. After all the 2-vinylpyridine has been added, the stirring is continued for about 1 to 2 hours longer. The mixture is then allowed to stand at room temperature overnight. During such standing, crystals of 2-pyridylethylpyridinium thiocyanate crystallize from the solution; these crystals are separated from the mother liquor in any convenient manner. The 2- pyridylethylpyridinium thiocyanate thus obtained is fairly pure and can be used as such for many purposes, if however a greater purity is desired the above obtained product is recrystallized from any suitable solvent, as from acetone.

The purified 2-pyridylethylpyridinium thiocyanate melts at about 115° C.; it is freely soluble in water, but is not soluble in hydrocarbon solvents.

One convenient manner of preparing the solution of thiocyanic acid in pyridine is as follows: Fifty parts of finely ground sodium thiocyanate are dispersed in 140 parts of pyridine; to this dispersion is added 18 parts of anhydrous hydrogen chloride, the dispersion is stirred during the addition of the hydrogen chloride and for about 15 minutes after all of the hydrogen chloride has been added; the hydrogen chloride reacts with the sodium thiocyanate to form sodium chloride, which precipitates from the solution, and thiocyanic acid, which dissolves in the pyridine; the sodium chloride is separated from the solution by filtration.

EXAMPLE 3

*6-methyl-2-pyridylethyl-4'-methylpyridinium chloride*

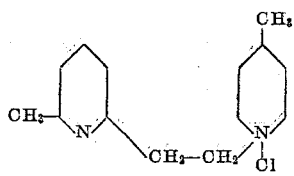

A solution of 129 parts of 4-picoline hydrochloride in 100 to 120 parts of 4-picoline is prepared in any convenient manner. While stirring the 4-picoline hydrochloride solution, 119 parts of 2-vinyl-6-methylpyridine is slowly added to it. After all of the 2-vinyl-6-methylpyridine has been added, the mixture is stirred for about one hour longer. Then the mixture is cooled to room temperature, upon such cooling 6-methyl-2-pyridylethyl-4'-methylpyridinium chloride crystallizes from the solution. The crystals are separated from the mother liquor by filtration. They are further purified by recrystallization from n-butanol. The 6-methyl-2-pyridylethyl-4'-methylpyridinium chloride melts at about 210° C.

EXAMPLE 4

*2-pyridylethylpyridinium sulfate*

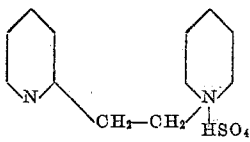

While vigorously stirring 400 parts of pyridine add to it 50 parts of concentrated sulfuric acid. A reaction occurs forming a suspension of finely divided pyridine sulfate in the pyridine and bringing about a rise in temperature of the mixture. The mixture is cooled to about 30° C. to 40° C. and while stirring it, 50 parts of 2-vinylpyridine is slowly added to it. A reaction occurs almost immediately, as evidenced by the precipitation of crystals of 2-pyridylethylpyridinium sulfate. After all of the 2-vinylpyridine has been added the mixture is stirred for about one hour longer, then it is cooled to room temperature. The crystals of 2-pyridylethylpyridinium sulfate are separated, as by filtration; they are purified by recrystallization from ethyl alcohol. The so purified 2-pyridylethylpyridinium sulfate melts at about 169° C.

EXAMPLE 5

*4-pyridylethyl-4'-n-amylpyridinium chloride*

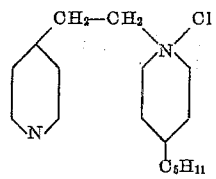

A solution of 93 parts of 4-n-amylpyridine hydrochloride in 70 to 80 parts of 4-n-amylpyridine is prepared in any convenient manner. While stirring the 4-n-amylpyridine hydrochloride solution, 52 parts of 4-vinylpyridine is slowly added to it. A reaction occurs almost immediately, a precipitate is formed. After all of the 4-vinylpyridine has been added, the stirring is continued for about 30 to 60 minutes. Then the mixture is cooled to room temperature and the precipitate, which is 4-pyridylethyl-4'-n-amylpyridinium chloride, is separated from the mother liquor, as by filtration. The 4-pyridylethyl-4'-n-amylpyridinium chloride is washed with benzene to remove any adhering mother liquor, and is then dried. The 4-pyridylethyl-4'-n-amylpyridinium chloride thus obtained melts at about 242° C.

EXAMPLE 6

*5-ethyl-2-pyridylethylisoquinolinium chloride*

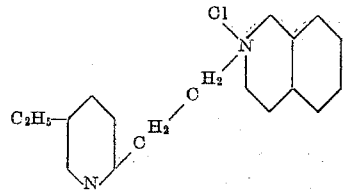

A mixture of 82 parts of isoquinoline hydrochloride (4,5-benzopyridine hydrochloride) and 60 to 80 parts of isoquinoline is prepared in any convenient manner; one convenient way of preparing such a mixture is to mix 50 parts of aqueous (36%) hydrochloric acid with 124 to 144 parts of isoquinoline and then remove the water (which was introduced with the hydrochloric acid) by distillation. The mixture of isoquinoline hydrochloride is liquified by heating it to about 100° C. to 140° C.; while maintaining it in liquid form and while stirring it, 67 parts of 2-vinyl-5-ethylpyridine is slowly added to it. After all the 2-vinyl-5-ethyl-pyridine has been added, the stirring is continued for about 30 minutes. The mixture is then cooled to room temperature. The 5-ethyl-2-pyridylethylpyridinium chloride, which crystallizes from the solution upon such cooling, is separated from the mother liquor by filtration. The crude product thus obtained is purified by recrystallization from butyl alcohol. The thus purified 5-ethyl-2-pyridylethylisoquinolinium chloride melts at about 150° C.

EXAMPLE 7

*2-pyridylethyl-4'-propanolpyridinium sulfate*

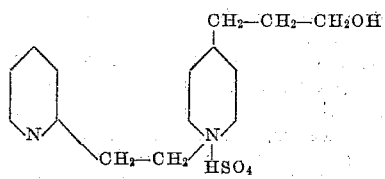

Sixty-nine parts of 4-propanolpyridine are dissolved in 400 parts of methanol. This solution is cooled to about 5° C. and while being maintained at this temperature, 48 parts of concentrated sulfuric acid are slowly added. Then 52 parts of 2-vinylpyridine are added and the mixture stirred for about 2 hours. Now most of the methanol, about 350 parts, is removed by vacuum distillation, and the residue is cooled to below 0° C. Upon such cooling 2-pyridylethyl-4'-propanolpyridinium sulfate crystallizes out. (At times it is difficult to start the crystallization, and it is necessary to seed the cooled solution to cause crystallization.) The crystals of 2-pyridylethyl-4'-propanolpyridinium sulfate are separated from the mother liquor in any convenient manner, as by filtration. The thus recovered crystals are recrystallized from a solvent consisting of about three parts of acetone and one part of methanol. The so purified 2-pyridylethyl-4'-propanolpyridinium sulfate melts at about 117° C.

EXAMPLE 8

*2-pyridylethylpyridinium sulfate*

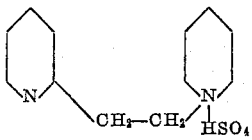

Seventy-five parts of pyridine is mixed with 10.5 parts of concentrated sulfuric acid. To this mixture is added 13.5 parts of 2-ethanolpyridine (a compound which upon dehydration is converted into a vinylpyridine); the resulting mixture is heated under reflux conditions for about 4 hours. During the refluxing period, 2-pyridylethylpyridinium sulfate separates as an oil. After the refluxing, the mixture is allowed to settle, whereupon two layers are formed. The lower layer, which is the 2-pyridylethylpyridinium sulfate is separated by decantation. The small amount of water and pyridine that is contained in the thus separated 2-pyridylethylpyridinium sulfate is removed by evaporation in vacuo. The dried 2-pyridylethylpyridinium sulfate is recrystallized from ethyl alcohol.

We believe the formulae used to represent the compounds formed in accordance with our invention correctly portray their molecular structure. We however are not to be bound by the molecular configuration of these compounds.

The compounds of this invention are useful as fungicides and in organic syntheses.

We claim as our invention:

1. Pyridylethylpyridinium compounds of the class consisting of a 2-pyridylethylpyridinium and a 4-pyridylethylpyridinium compound having the following general formula:

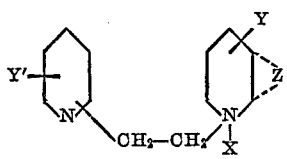

in which the group $$Z$$

represents one of the group consisting of hydrogen and a benzo radical; Y and Y' represent one of the group consisting of hydrogen and an alkyl radical; and X represents an anion.

2. Pyridylethylpyridinium compounds of the class consisting of a 2-pyridylethylpyridinium and a 4-pyridylethylpyridinium compound having the following general formula:

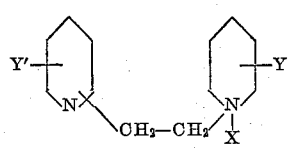

in which Y and Y' represent one consisting of the group of hydrogen and an alkyl radical; and X represents an anion.

3. A new compound having the following general formula:

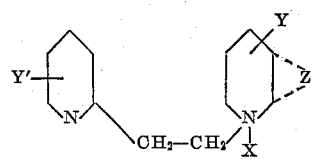

in which the group Z represents one of the group consisting of hydrogen and a benzo radical; Y and Y' represent one of the group consisting of hydrogen and an alkyl radical; and X represents an anion.

4. A new compound having the following general formula:

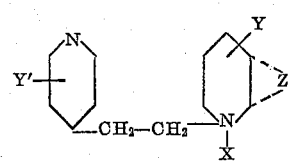

in which the group $$Z$$

represents one of the group consisting of hydrogen and a benzo radical; Y and Y' represent one of the group consisting of hydrogen and an alkyl radical; and X represents an anion.

5. The process of reacting a pyridine salt of an inorganic acid with a compound of the class consisting of a 2-vinylpyridine and a 4-vinylpyridine and a compound which upon dehydration is converted into a compound of the class consisting of a 2-vinylpyridine and a 4-vinylpyridine.

6. The process of reacting a compound of the class consisting of a 2-vinylpyridine and a 4-vinylpyridine with a pyridine salt of an inorganic acid.

7. The process of reacting a 2-vinylpyridine with a pyridine salt of an inorganic acid.

8. The process of reacting a 4-vinylpyridine with a pyridine salt of an inorganic acid.

FRANCIS E. CISLAK.
LESLIE H. SUTHERLAND.

REFERENCES CITED

The following references are of record in the file of this patent:

UNITED STATES PATENTS

| Number | Name | Date |
|---|---|---|
| 2,272,159 | Cislak | Feb. 3, 1942 |
| 2,300,741 | Cislak | Nov. 3, 1942 |
| 2,338,571 | Cislak | Jan. 4, 1944 |

OTHER REFERENCES

Sedgwick: "Organic Chemistry of Nitrogen," p. 531 (1937), Oxford Press.

Certificate of Correction

Patent No. 2,512,789 June 27, 1950

FRANCIS E. CISLAK ET AL.

It is hereby certified that errors appear in the above numbered patent requiring correction as follows:

In the grant, lines 1 and 13, name of co-inventor, for "Frank E. Cislak" read *Francis E. Cislak*;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*